United States Patent [19]

Küsters

[11] 3,778,104
[45] Dec. 11, 1973

[54] SEAT CONSISTING OF SEAT PORTION AND BACKREST, ESPECIALLY DRIVER SEAT FOR MOTOR VEHICLES

[75] Inventor: Heinz Peter Küsters, Erdmannhausen, Germany

[73] Assignee: Firma DR. -Ing. h.c.F. Prosche K.G., Stuttgart-Zuffenhausen, Germany

[22] Filed: Apr. 21, 1971

[21] Appl. No.: 135,834

[30] Foreign Application Priority Data
Apr. 21, 1970 Germany .................. P 20 19 069.6

[52] U.S. Cl. ................. 297/458, 297/284, 297/455, 297/460
[51] Int. Cl. ........ A47c 7/00, A47c 7/20, A47c 3/00, B60n 1/06
[58] Field of Search .................... 297/216, 218, 219, 297/223, 284, 452, 457, 459; 5/337, 338, 345

[56] References Cited
UNITED STATES PATENTS

| 3,147,997 | 9/1964 | Mason | 297/457 X |
|---|---|---|---|
| 3,567,278 | 3/1971 | Barecki et al. | 297/218 |
| 3,583,762 | 6/1971 | Strien | 297/458 |
| 3,495,871 | 2/1970 | Resag et al. | 297/284 |
| 3,273,877 | 9/1966 | Geller et al. | 267/84 |
| 2,892,489 | 6/1959 | Hurley | 297/457 X |
| 3,177,036 | 4/1965 | Halter | 297/459 X |

Primary Examiner—Casmir A. Nunberg
Attorney—Craig, Antonelli & Hill

[57] ABSTRACT

A seat with cushion supports for vehicles, especially motor veicles, which consists of a seat portion and a backrest, and in which a fatigue-free seating is achieved by the combination of the following features:

a. the seat portion and the backrest consist of molded shells that are covered with removable cushion supports;

b. the backrest of the seat is provided with support surfaces within the area of the shoulder blades and of the lumbar vertebrae; and c. the cushion support of the seat portion is constructed more hard within the area of the ischium tuberosities of the pelvis.

19 Claims, 6 Drawing Figures

SEAT CONSISTING OF SEAT PORTION AND BACKREST, ESPECIALLY DRIVER SEAT FOR MOTOR VEHICLES

The present invention relates to a seat consisting of seat portion and backrest with cushioned supports for vehicles, especially to a driver seat for motor vehicles, in which certain measures are taken for a fatigue-free seating.

The aim of the present invention is a seat for motor vehicles matched to the human body. This seat is also to be suited for cross-country vehicles.

It is already known in the prior art to construct seats of vehicles in such a manner that they permit as fatigue-free a seating as possible over longer periods of time (German-Offenlegungsschrift 1,405,207). With this type of construction of a vehicle seat, the cushioning of the seat portion is constructed less yielding within the area of the ischium tuberosities of the pelvis than the remaining seat cushioning. A relaxed seating becomes possible thereby since the ischium tuberosities absorb by way of the harder cushion zones a large portion of the body weight. However, it is disadvantageous that with this construction of a vehicle seat, only measures for the ischium tuberosities of the pelvis were taken and the important position and support functions of the spinal column were far-reachingly ignored so that a fatigue-free and relaxed seating is achieved only in part. The pelvis has the tendency with a seated human person, by reason of the endeavor of the lumbar vertebra column to pass over from its normal lordosis into the kyphosis and by reason of the increasing bending in the hip joints, to tilt rearwardly. This phenomenon is designated as pelvis back-rotation. This position which disturbs the blood circulation and the muscle organs of the abdominal area has not been taken into consideration in the prior art construction so that a longer seating leads to muscle tensions and as a result to painful disturbances of the spinal column. In a further seat construction (U.S. Pat. No. 3,086,817), the seat portion of the seat is supported within the area of the ischium tuberosities of the pelvis and the backrest within the area of the lumbar vertebrae or of the spinal column by corresponding cushioning supports. Furthermore, with this type of construction the cushion support of the backrest is arranged displaceably so that the spinal column support can be adjusted in its height for the respective person. However, this type of construction does not yet permit an optimum seating position. The spinal column is supported over a predetermined length by the construction of the adjustable spinal column support which, in cross section, has the shape of a circular section, whereby, however, due to the shape of the support, the shoulder blades have no or only slight support surfaces so that when driving over road bumps or road surface unevenesses, the body is lifted off from the seat surface and is subsequently tossed again back against the seat. Due to the absence of a shoulder blade support, the falling-back of the body is not braked whereby the band disks are highly strained and as a result thereof, serious damages of the spinal column may occur. Additionally, the lateral guidance of this seat construction is too small whereby, when driving through curves, the seated person is burdened with unnecessary equalization work of the body muscle system. A further seat construction (German Pat. No. 1,117,274) essentially consists of a shell-shaped unitary seat with molded-on backrest whose cushion and shell construction is matched far-reachingly to the human body. However, disadvantageous is the fact that also with this type of construction a support of the shoulder blades is missing. Additionally, the support surface of the seat portion for the ischium tuberosities and the support surface of the lumbar vertebrae at the backrest is constructed in one piece whereby an optimum support of the ischium tuberosities is not achieved and the danger of a lateral sliding off from the support surfaces exists. Simultaneously, due to the unitary construction of the lumbar vertebrae support, the clearance or free space of the spinal extensions is strongly restricted so that under certain circumstances, painful pressure places become noticeable within this area. Furthermore, with this prior art construction, an adjustability of the backrest does not exist so that the seated person has to sit in a forced position. Furthermore, the manufacture of such a seat is expensive and complicated and, if several persons utilize the seat, has to be exchanged as a unit in order to achieve a seat position for the respective person which is correct for the body.

The present invention, in contradistinction thereto, is concerned with the task to provide a seat consisting of seat portion and of a backrest, especially a driver seat for motor vehicles, which excels by a body-correct construction with the aim to permit also during longer drives or stays in the vehicle a far-reachingly fatigue-free seating position that remains preserved also in extreme seating positions, such as, for example, in the half-lying position.

The aims of the present invention are achieved by the combination of the following features:

a. The seating portion and the backrest consist of molded shells which are covered with removable cushioning supports;

b. The backrest is provided with support surfaces within the area of the shoulder blades and of the lumbar vertebrae; and c. The cushion support of the seat portion is constructed more hard or stiff within the area of the ischium tuberosities of the pelvis.

Advantageously, the molded shells for the seat portion and backrest are adjustably arranged with respect to each other within a predetermined angle whereby the molded shell of the seat portion is provided with a trough within the area of the pelvis and the molded shell of the backrest is constructed essentially flat. It is of particular advantage that the support surfaces for the shoulder blades and of the lumbar vertebrae are constituted by indentations in the molded shell of the backrest. Appropriately, the indentations for the lumbar vertebrae and the shoulder blades are arranged on both sides of the longitudinal center plane of the backrest and are directed toward the cushion support. It is advantageous that the cushion supports consisting of an air-permeable material are arranged individually removable. A further advantage resides in the fact that the cushion supports are provided with several straps which are adapted to be secured by means of fastening devices arranged at the molded shells. The cushion support of the seat portion corresponds in a favorable manner to the shape of the seat shell and is provided at the bottom side of the forward edge of the seat with a hook-like bulge.

The advantages achieved with the present invention essentially consist in that by the characterized construction of the seat, a decrease in effort on the part of the driver and an excessive straining of certain body parts such as the band system, the positioning muscular system, etc., is avoided. Furthermore, possible harmful consequences are avoided. A good support of the pelvis as well as of the lumbar vertebrae and of the shoulder blades is made possible by the characterized support surfaces of the seat portion and of the backrest whereby the entire body is surrounded and retained in its most important places by the seat and, as a result thereof, an unstressing or relaxing of the spinal column is achieved so that the latter no longer acts as shock absorber. By the recessing of the seat portion within the area of the pelvis, additionally a good support of the rump is made possible whereby particularly high lateral guide parts can be dispenses with. A seat simple to manufacture and therewith economizing costs is obtained by the construction of the seat portion and of the backrest as molded shells with removable cushion supports. By reason of the fact that the backrest is adjustably arranged relative to the seat portion within a predetermined angle, a good body-correct seat position can be adjusted so that the seat as regards its position can be matched to the respective driver. Due to the simple, far-reachingly rectilinearly extending molded shell of the backrest, the latter can be manufactured with relatively slight expenditures and without complicated devices. A simple cushion support without special cushion constructions is made possible by the support surfaces included in the molded shell of the backrest so that also in that connection a considerable cost-saving is made possible. A good aeration or venting of the seat is achieved by the construction of the cushion supports consisting of air-permeable material and an excessive perspiration of the abutting body parts is avoided thereby, whence further fatigue appearances are prevented. In order to leave sufficient clearance for the spinal extensions of the lumbar vertebra column, the support surfaces are arranged on both sides of the lumbar vertebrae so that pressure places are avoided far-reachingly within this area and nonetheless a body-correct support remains preserved. Furthermore, this construction precludes a greater strain of the spinal column by the support effect of the backrest.

Furthermore, the construction of the shoulder blade support is arranged on both sides of the center longitudinal plane of the backrest whereby a body-correct support is also achieved with the advantage that when driving over bumps, etc., in the road surface, a lifting-off from the seat is prevented whereby the spinal column remains far-reachingly protected against harmful impacts and shocks. Moreover, the cushion supports are provided with straps which are adapted to be secured at the molded shells of the seat portion and of the backrest by means of fastening devices. The possibility exists as a result thereof to interchange the individual cushion supports rapidly and safely with the advantage that in vehicles in which more frequently a driver change has to be undertaken, each driver receives a set of cushion supports. In order to facilitate the installation of the cushion supports and to achieve a secure fastening, the cushion support of the seat portion is provided with a hook-like bulge portion at the bottom side of the forward edge of the seat. The bulge portion of the cushion support is engaged in a rim portion arranged at the molded shell whereby the cushion support is fixed relative to the molded shell and the respectively correct position of the cushion support is obtained thereby.

These and further objects, features and advantages of the present invention will become more obvious from the following description when taken in connection with the accompanying drawing which shows, for purposes of illustration only, one embodiment in accordance with the present invention, and wherein.

Figure 1:
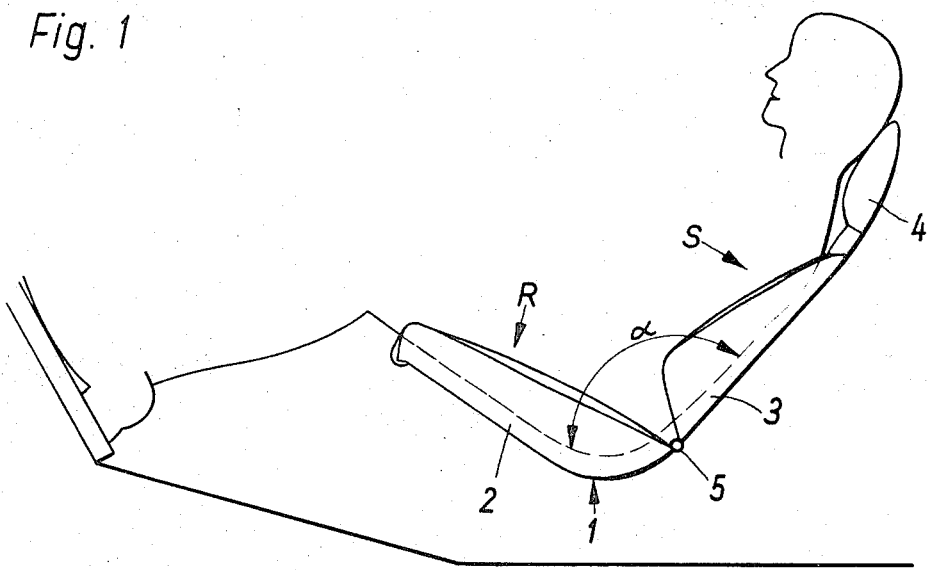
FIG. 1 is a schematic side view of the seat according to the present invention in the normal position of use.
Figure 2:
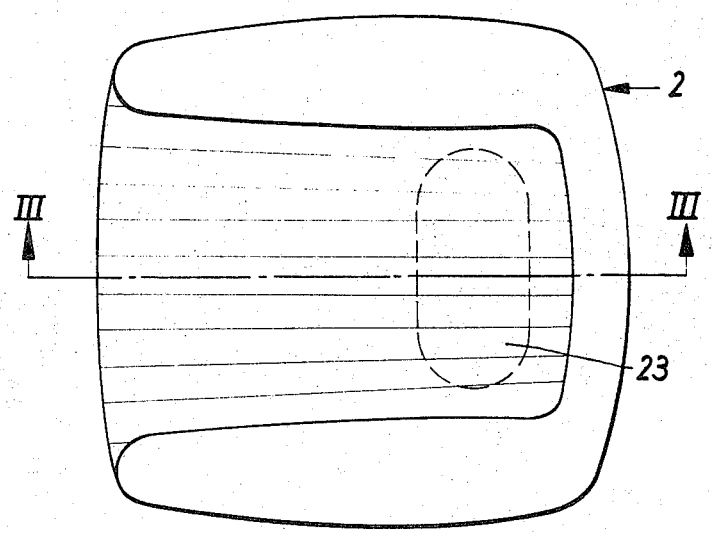
FIG. 2 is a plan view on the seat portion of the seat taken in the direction of arrow R of FIG. 1, whereby the area of the cushion stiffening is indicated in dash lines.
Figure 3:
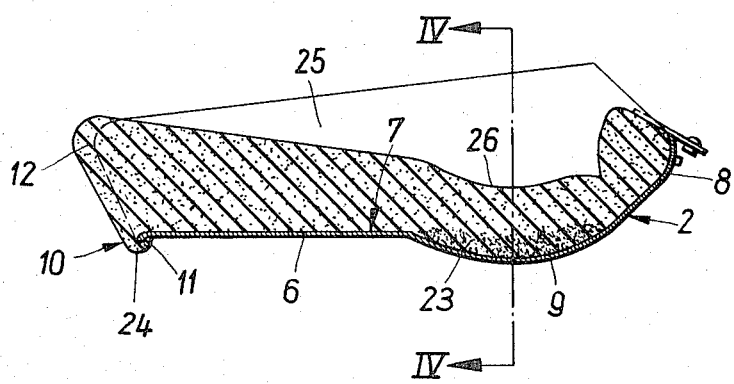
FIG. 3 is a longitudinal cross-sectional view through the seat portion of the seat taken along line III—III of FIG. 2.
Figure 4:
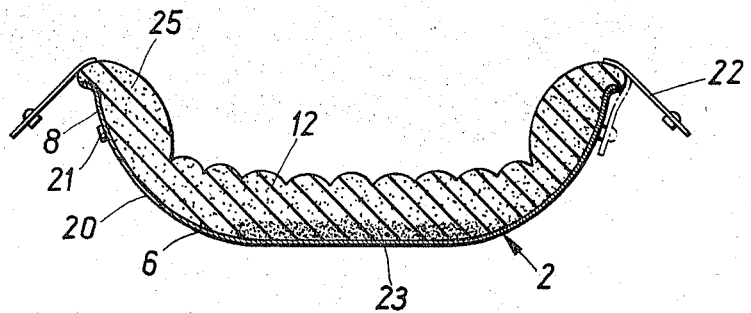
FIG. 4 is a transverse cross-sectional view through the seat portion of the seat taken along line IV—IV of FIG. 3.
Figure 5:
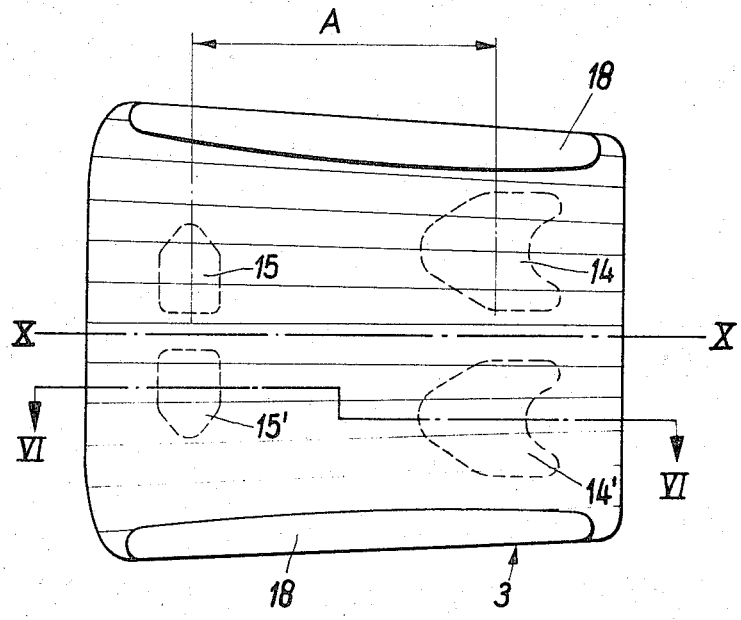
FIG. 5 is a plan view on the backrest of the seat taken in the direction of arrow S of FIG. 1, whereby the position and shape of the support surfaces are indicated in dash lines.
Figure 6:
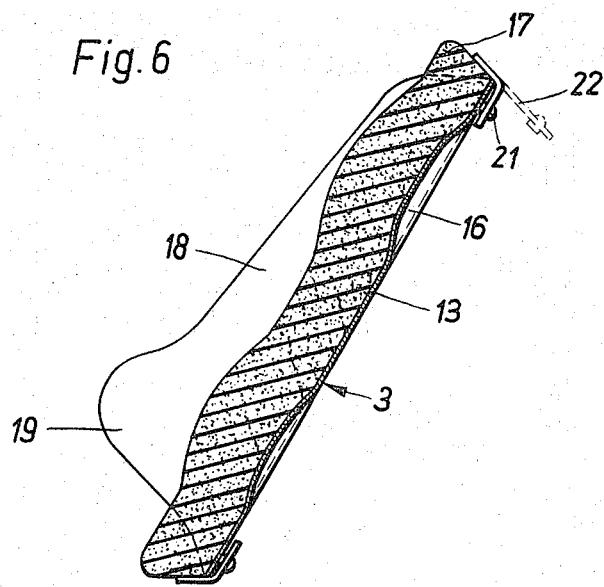
FIG. 6 is a longitudinal cross-sectional view through the backrest taken along line VI—VI of FIG. 5.

Referring now to the drawing wherein like reference numerals are used throughout the various views to designate like parts, reference numeral 1 generally designates a vehicle seat arranged in a motor vehicle which esssentially consists of a seat portion 2 and of a backrest 3, at which is secured a neck or headrest 4. The seat 1 is adjustably arranged in the vehicle about a common axis of rotation of conventional construction and thereof not illustrated in detail. The backrest 3 is adjustably secured relative to the seat portion 2 within an angular range α of between about 90° and about 120° by means of a conventional rotary joint 5 arranged between the seat portion 2 and the backrest 3. The seat portion 2 consists of a molded shell 6 (FIGS. 3 and 4) which includes a circumferential rim 8 laterally within the area of the thighs and of the pelvis which runs about the seat portion 2 and extends upwardly starting from the cushion support surface 7. Furthermore, a trough 9 is provided in the molded shell 6 within the area of the pelvis which serves for the better lateral guidance of the pelvis. An edge 11 which is directed downwardly over the forward edge generally designated by reference numeral 10 of the molded shell 6 in FIG. 3 of the drawing serves for receiving and mounting a cushion support 12. The backrest 3 also consists of a molded shell 3 in which are arranged on both sides of the center longitudinal plane X—X, support surfaces 14, 14', 15, 15' formed by pressed-in portions or indentations 16. The support surfaces 14, 14' serve for the accommodation of the shoulder blades and are provided at a corresponding height in the backrest 3. The support surfaces 15, 15' serve for the accommodation of the lumbar vertebrae and are arranged at a predetermined distance A from the shoulder blade support. Both support surfaces 14, 14' and 15, 15' extend from the plane of the molded shell 13 in a direction toward a cushion support 17. The cushion support 17 possesses a uniform cushion hardness or stiffness over its entire cushion area. The molded shell 13 of the backrest 3 possesses on both sides a support rim 18 extending in the longitudinal direction of the backrest 3, which terminates within the area of the lumbar vertebrae support 15, 15' in a hill-like raised portion or projection 19. Along the outer circumference of the molded shell 13 of the backrest 3 and at the lateral surfaces 20 of the rim 8 of the molded shell 6 of the seat surface 2 are arranged conventional securing or fastening means, for example, in the form of snap buttons 21. The snap buttons 21 serve for the fastening of the cushion supports 12 and 17 which for that purpose are provided each with straps 22 arranged at the spacing of the snap buttons 21. The cushion support 12 of the molded shell 6 of the seat portion 2 possesses a cushion 23 constructed more hard within the area of the trough 9, which is coordinated to the ischium tuberosities of the pelvis. As a result thereof, the ischium tuberosities cannot press any local indentations into the cushion support 12 at this place. The cushion support 12 is provided with a hook-like bulge 24 within the area of the rim 11 arranged at the forward edge 10 of the molded shell 6. Furthermore, the cushion support 12 has a U-shaped form in cross section (FIG. 4) whereby lateral cushion rims 25 abut against the circumferential rim 8 of the molded shell 6. The cushion support 12 is further provided with a trough 26 that corresponds to the shape of the trough 9.

In order to place the seat in condition ready for use, at first the cushion support 12 of the seat portion 2 is hooked with its hook-like bulge portion 24 into the rim portion 11 of the forward edge 10 of the shell and is then placed into the molded shell 6. Thereafter, the straps 22 are engaged in the snap buttons 21 whence the cushion support 12 is fixed and retained. The cushion support 17 is thereafter inserted in like manner into the molded shell 13 of the backrest 3 and is secured by means of the straps 22. The cushion support 17 is thereby locally pressed in by the support surfaces 14, 14', 15, 15' whereby supports for the shoulder blades and lumbar vertebrae are formed.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A seat comprising a seat portion and a backrest and provided with a cushion support means for vehicles, especially a driver seat for motor vehicles, characterized by means providing a fatigue-free seating which include molded shell means forming said seat portion and backrest, respectively, which are covered by removable cushion support means, the molded shell means forming the backrest of the seat being provided with indentations within the area of the shoulder blades and of the lumbar vertebrae for providing support surface means for the shoulder blades and lumbar vertebrae, and the cushion support means of the seat portion being constructed more hard within area of the ischium tuberosities of the pelvis.

2. A seat according to claim 1, characterized in that the molded shell means for the seat portion and backrest are adjustably arranged with respect to each other within a predetermined angle, the shell means of the seating portion being provided with a trough within the area of the pelvis and the shell means of the backrest being constructed approximately flat in the areas surrounding the indentations.

3. A seat according to claim 2, characterized in that the indentations are arranged on both sides of the longitudinal center plane of the backrest and are directed toward a respective cushion support means.

4. A seat according to claim 3, characterized in that the cushion support means consist of air-permeable material and are arranged individually removable.

5. A seat according to claim 4, characterized in that the cushion support means are provided with several securing straps secured by way of fastening means arranged at the shell means.

6. A seat according to claim 5, characterized in that the cushion support means of the seat portion corresponds essentially to the shape of the seat shell means and is provided at the bottom side of the forward seat edge with a hook-like bulge portion.

7. A seat according to claim 1, characterized in that the indentations are arranged on both sides of the longitudinal center plane of the backrest and are directed toward a respective cushion support means.

8. A seat according to claim 1, characterized in that the cushion support means consist of air-permeable material and are arranged individually removable.

9. A seat according to claim 1, characterized in that the cushion support means are provided with several securing straps secured by way of fastening means arranged at the shell means.

10. A seat according to claim 1, characterized in that the cushion support means of the seat portion corresponds essentially to the shape of the seat shell means and is provided at the bottom side of the forward seat edge with a hook-like bulge portion.

11. A seat according to claim 1, characterized in that the cushion support means consist of air-permeable material and are arranged individually removable.

12. A seat according to claim 2, characterized in that the cushion support means of the seat portion corresponds essentially to the shape of the seat shell means and is provided at the bottom side of the forward edge with a hook-like bulge portion.

13. A seat comprising a seat portion and a backrest and provided with cushion support means for vehicles, especially a driver seat for motor vehicles, characterized by means providing a fatigue-free seating which include molded shell means forming said seat portion and said backrest, respectively, which are covered by removable cushion support means, the molded shell means of the seating portion being provided with a trough within the area of the pelvis of the the cushion support means of the seat portion being constructed harder within the area of the ischium tuberosities of the pelvis, and the molded shell means forming the backrest of the seat being provided with indentations within the area of the shoulder blades and of the lumbar vertebrae for providing support surface means for the shoulder blades and lumbar vertebrae.

14. A seat according to claim 13, characterized in that the molded shell means forming the seat portion and the backrest are adjustably arranged with respect to each other within a predetermined angle.

15. A seat according to claim 13, characterized in that the indentations in the molded shell means of the backrest are arranged on both sides of the longitudinal center plane of the backrest and are directed toward a respective cushion support means.

16. An adjustable seat for vehicles, comprising first and second molded shells forming respectively seat portions and backrest portions of the seat, a first removable cushion provided on said first molded shell and having a shape corresponding essentially to the shape of said first molded shell, said first cushion being provided with a hook-like bulge portion at the front edge thereof for engaging the front edge of the first molded shell, said first molded shell being provided with a trough within the area of the pelvis, said first cushion being constructed harder in the area of the pelvis than in the other areas of said first cushion, said second molded shell being provided with indentations in the area of the shoulder blades and the area of the lumbar vertebrae whereby the trough in said first molded shell and the indentations in said second molded shell provide supporting surfaces for the shoulder blades and lumbar vertebrae.

17. An adjustable seat according to claim 16, further comprising a second removable cushion provided on said second molded shell, and said indentations in said second molded shell being arranged at both sides of the longitudinal center plane of said second molded shell and extend into the rear side of said second cushion.

18. An adjustable seat according to claim 17, wherein said first and second cushions are constructed of air-permeable material and are arranged individually removable.

19. An adjustable seat according to claim 18, wherein said first and second cushions are provided with a plurality of securing straps secured by way of fastening means arranged at said first and second molded shells.

* * * * *